(12) United States Patent
Otsuka et al.

(10) Patent No.: US 7,479,903 B2
(45) Date of Patent: Jan. 20, 2009

(54) INPUT DEVICE USING ELASTIC MATERIAL

(75) Inventors: Rieko Otsuka, Fuchu (JP); Takeshi Hoshino, Kodaira (JP); Youichi Horii, Mitaka (JP)

(73) Assignee: Hitachi, Ltd., Tokyo (JP)

( * ) Notice: Subject to any disclaimer, the term of this patent is extended or adjusted under 35 U.S.C. 154(b) by 371 days.

(21) Appl. No.: 11/483,159

(22) Filed: Jul. 10, 2006

(65) Prior Publication Data
US 2007/0051591 A1 Mar. 8, 2007

(30) Foreign Application Priority Data
Sep. 6, 2005 (JP) ............................. 2005-257242

(51) Int. Cl.
*H03M 11/00* (2006.01)
(52) U.S. Cl. .................... 341/22; 345/168; 345/173; 702/139; 702/150; 708/142
(58) Field of Classification Search .................. 341/22; 345/168, 176; 702/139, 150; 708/142–144
See application file for complete search history.

(56) References Cited

U.S. PATENT DOCUMENTS 5,581,484 A * 12/1996 Prince ..................... 702/150
2004/0041716 A1 * 3/2004 Barber ........................ 341/22
2004/0233173 A1 * 11/2004 Bryant ....................... 345/169

FOREIGN PATENT DOCUMENTS

JP         08-171440         9/1994

\* cited by examiner

*Primary Examiner*—Timothy Edwards, Jr.
(74) *Attorney, Agent, or Firm*—Reed Smith LLP; Stanley P. Fisher, Esq.; Juan Carlos A. Marquez, Esq.

(57) ABSTRACT

A conventional mouse and keyboard poses great load on the user's finger and hands at key operation, and the material used for its surface is rigid. An input device which can reduce the load on the user's finger, and gives soft touch by avoiding abrupt change in downward pressure at key operation. The input device includes elastic material on the surface, a camera to image the back surface of a key when the key is pressed, an image processor which determines finger position from the image, and an output which generates a signal according to the finger position. By using this input device, the user can carry out operations similar to those achieved by a mouse and keyboard for a computer.

8 Claims, 15 Drawing Sheets

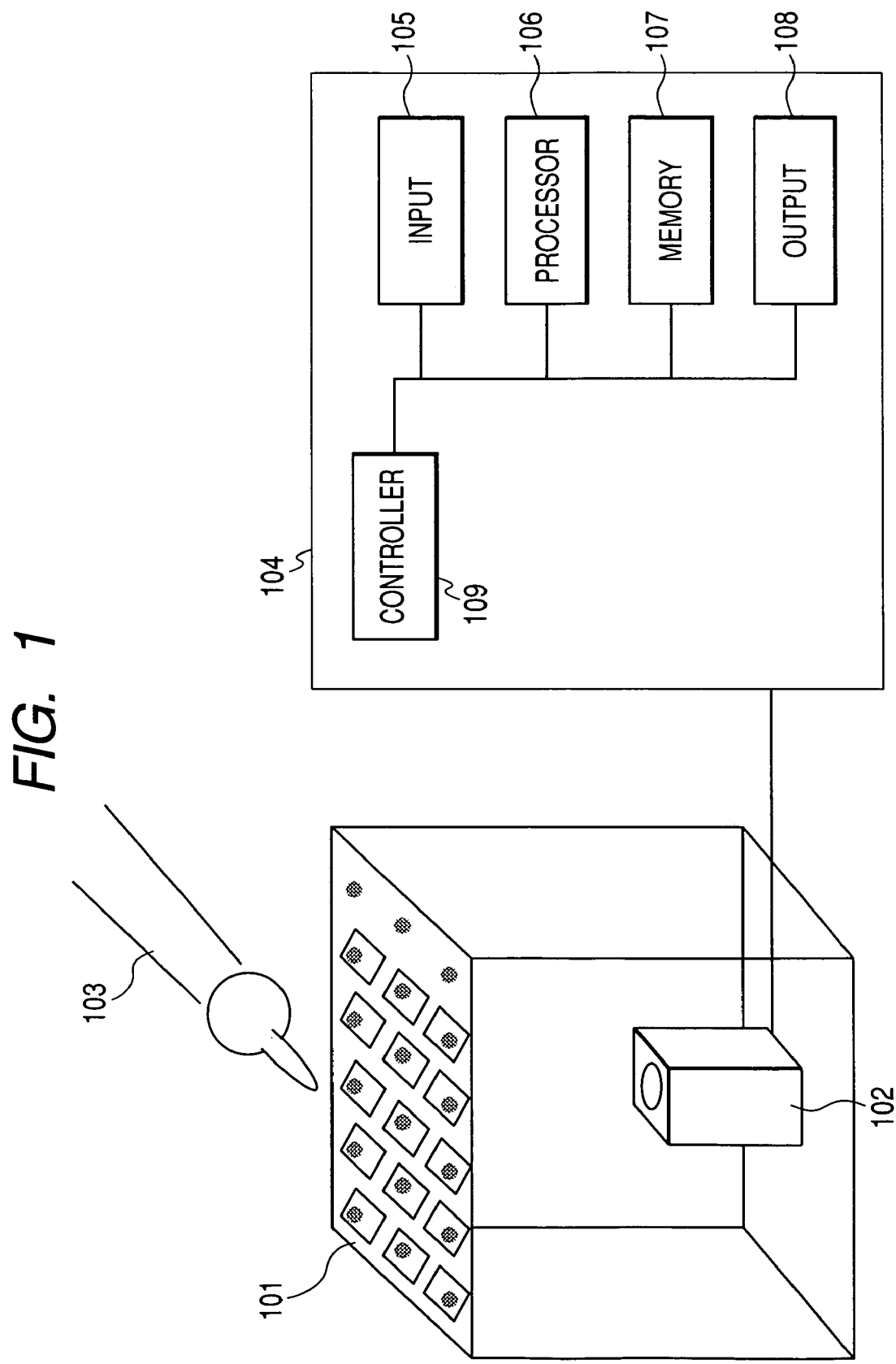

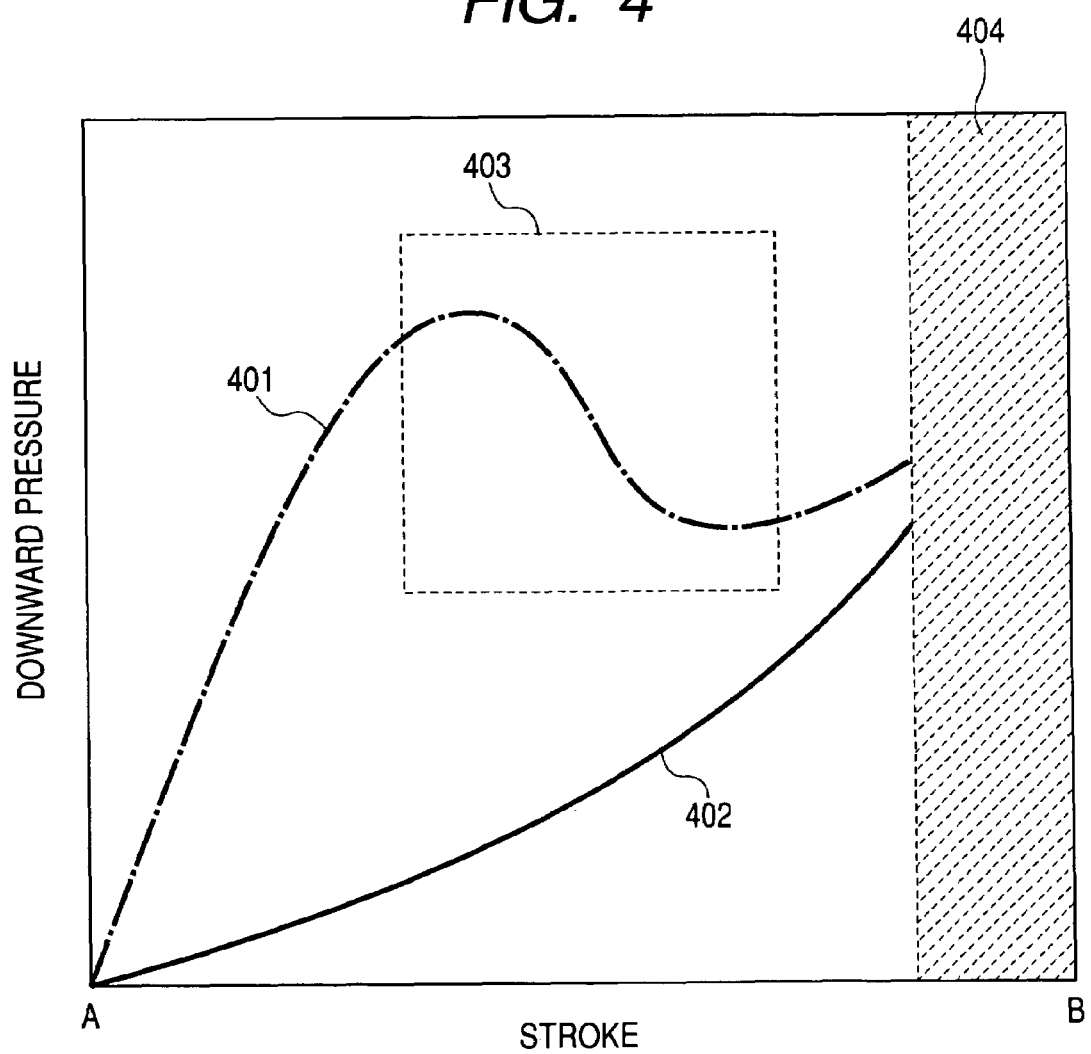

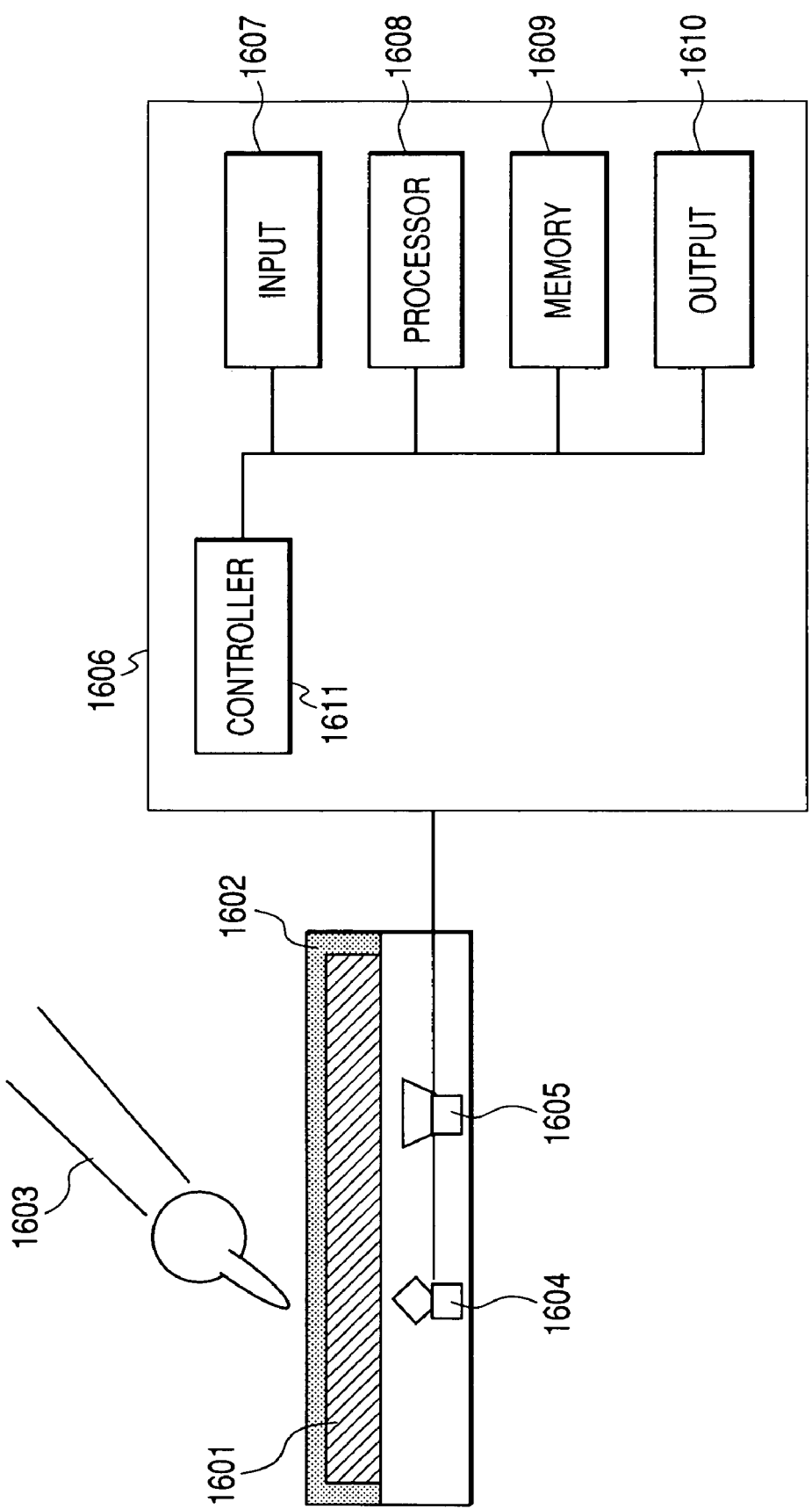

INPUT DEVICE USING ELASTIC MATERIAL

CLAIM OF PRIORITY

The present application claims priority from Japanese application JP 2005-257242 filed on Sep. 6, 2005, the content of which is hereby incorporated by reference into this application.

FIELD OF THE INVENTION

The invention relates to an input device having elastic material on its surface.

BACKGROUND OF THE INVENTION

A keyboard is widely used as a basic input device of a computer. Generally, a keyboard includes a key top and an electric switch, and has a stroke which indicates the degree of depression in order to generate "click" feeling at the time of input. A user feels as if the load is reduced at the point when the switch is turned on. This generates "click" feeling and the user can recognize the key is actually input.

However, the shock at the time of pressing a key and prolonged use of a keyboard poses load on the fingers and hands of the user. Recently, many users who use computers in everyday work suffer from tendovaginitis.

SUMMARY OF THE INVENTION

The invention provides a mouse and a keyboard having small stroke and soft touch in order to avoid tendovaginitis. The invention also provides a mouse which can be operated by feet instead of hands.

An input device incorporating a touch panel and elastic material is disclosed in JP 1996-171440 A titled "Electronic Device", for example. This application discloses an electronics having a structure similar to an infrared touch panel. The surface of the electronics is sealed with an elastic member to avoid dirt.

Unfortunately, in this device, a user cannot replace the elastic member according to his/her preference. Generally, every user has different feelings as to stroke and "click" of the key. A user suffering from tendovaginitis wants to use an input device most comfortable for him, but has to select it from limited options. Furthermore, key operations involving two keys, for example pressing one alphabet key and "Shift key" or "Ctrl key" simultaneously, may frequently be necessary. However this operation cannot be carried out by above input device.

The invention addresses these problems. First, the invention provides an input device which gives less shock on the fingers at keyboard operation, by providing soft material on the surface of the keyboard. This input device will be of great use for those who have difficulty in keyboard operation due to tendovaginitis, for example. Secondly, the invention provides an input device which can be customized according to user's preference, by repeatedly setting or replacing the layout or material of the keyboard.

In order to address the above objects, the input device of the invention includes elastic material covering the part of a key pressed by the user's finger, and a unit to detect a position where the elastic material locally stretches when the user presses down that position on the elastic material.

The input device further includes an imaging unit which images the position pressed by the finger, an image processing unit which determines the position of the finger by analyzing the image, a signal generation unit which generates a signal according to the result of image processing, and a memory which stores correspondence between a finger position and a signal.

The input device further includes a detection unit which detects the pressed position using an infrared touch panel for example, a signal generation unit which generates a signal according to the position information thus obtained, and a memory which stores correspondence between a finger position and a signal.

The elastic material of the key can be replaced as desired. The input device further includes a setting unit by which the user assigns the key as desired, and a memory which stores the key assigned by the user.

The input device further includes a unit to provide a notification by light or sound based on the finger position to inform the user that a signal corresponding to the key input is generated.

The input device further includes a reader which reads tag information such as radio frequency identification (RFID), a memory which stores information associated to the tag, and a unit to retrieve the information to assist the user in replacing the elastic material suitable for specific application.

This structure can reduce the load posed on the user's fingers during keyboard operation.

By replacing the elastic material on the key top according to the user's preference or specific application, the user can have comfortable stroke and click feeling. Furthermore, the part the user's finger touches can be kept clean.

The elastic material on the key top can substantially reduce the switch sound at click and key-down. When the user wants feeling of "click" at pressing, the computer can make an artificial sound. Alternatively, a light source such as a light emitting diode (LED) can be effectively used instead of sound.

Next, exemplary embodiments will be described in detail with reference to FIGS. 1 to 17. Throughout several drawings, same or similar components or arrows will be referred using same or similar reference numerals, and the description thereof will not be repeated. It should be appreciated that the embodiments are described for illustrative purpose only, and the invention is not limited thereto.

BRIEF DESCRIPTION OF THE DRAWINGS

FIG. 1 is a block diagram which illustrates an input device according to a first embodiment of the invention;

FIG. 4 illustrates change in pressure applied on the input device according to the first embodiment of the invention, and that on a conventional input device;

FIG. 16 illustrates an example wherein the user can feel "click" at input operation of the input device according to the third embodiment of the invention.

DETAILED DESCRIPTION OF THE PREFERRED EMBODIMENTS

First Embodiment

Figure 2A:
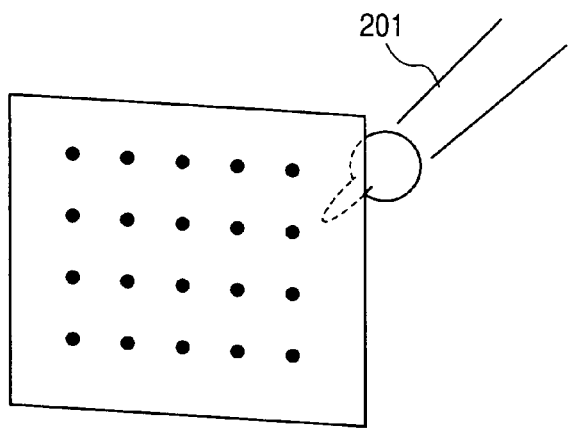
FIG. 2A and FIG. 2B illustrate the back surface before and after pressing the elastic member of the input device according to the first embodiment of the invention.

FIGS. 1 to 10 illustrate a first embodiment of the invention.

FIG. 1 is a block diagram which illustrates an embodiment of the invention. In the figure, 101 is an elastic (film) member having a circumference or corners fixed on a frame, 102 is an imaging device such as a camera installed to image the back surface of elastic member 101, 103 is a user, 104 is a computer device such as a personal computer, 105 is an input which acquires an image taken by imaging device 102, 106 is a processor which detects the pressed position by analyzing the image, 107 is a memory which stores information including setting information, 108 is an output which generates a signal representing a key event based on the pressed position and setting information, and 109 is a controller which controls operation of input 105, processor 106, memory 107 and output 108.

The elastic member may be made by a film comprising silicon rubber, or a fabric of nylon or polyurethane having high elasticity, for example.

The back surface of elastic member 101 has grid points. The points are separated by equal spacing from each other. The spacing between points can be set as desired according to intended precision. For example, for each key disposed on the top surface of the elastic member, one grid point is sufficient. However, the more points a key has, the more precise identification of the pressed position can be achieved.

When the back surface of elastic member 101 is imaged by imaging device 102 to determine the pressed position from the image, a plurality of points can be identified if the elastic member has adequate elasticity, because the elastic member stretches only at points pressed. Therefore, a user can carry out an operation involving two keys, for example, pressing one alphabet key and "Shift key" or "Ctrl key" simultaneously.

In the figure, imaging device 102 is installed so as to take an image of whole back surface of elastic member 101. Alternatively, a plurality of imaging devices can be used to take partial images of the back surface. In this arrangement, the distance between elastic member 101 and imaging device 102 can be reduced.

The name of the key is indicated on the top surface of elastic member 101 (key top) by direct printing or a key label. User 103 can confirm the key to be input, and make input by pressing the key position on the top surface of elastic member 101.

Figure 2B:
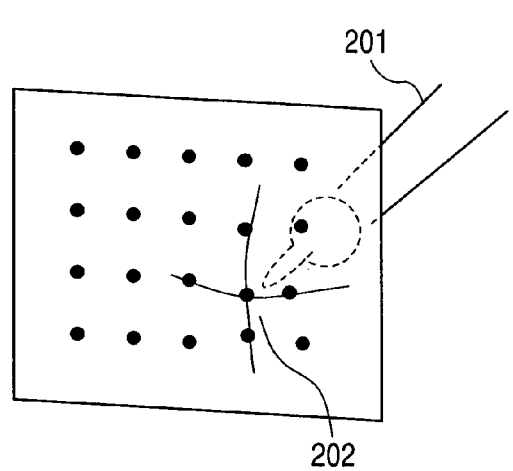

FIG. 2A and FIG. 2B illustrate the back surface of the elastic member of the invention. FIG. 2A illustrates the surface before the elastic member is pressed with a finger, and FIG. 2B illustrates the surface after the elastic member is pressed. Before pressing, the elastic member is flat without bending so that the grid point position on the back surface of the elastic member is not displaced. When the top surface of the elastic member is pressed by a finger, the elastic member around the pressed position stretches. Some grid points on the back surface seem to be displaced according to the stretch of the elastic member. By comparing the images taken in the conditions illustrated in FIG. 2A and FIG. 2B, point 202 pressed by user 201 can be determined based on the direction and amount of the displacement of the points.

The force applied by the user pressing the key can be calculated based on the amount of the displacement of grid points. Depending on the force thus calculated, a signal to be generated can be altered. For example when a scrolling key is pressed, the scroll amount/speed can be adjusted according to the force applied thereto.

Figure 3A:
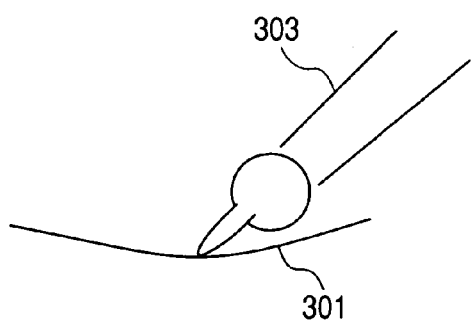
FIG. 3A and FIG. 3B illustrate characteristics necessary for the elastic member of the input device according to the first embodiment of the invention.
Figure 3B:
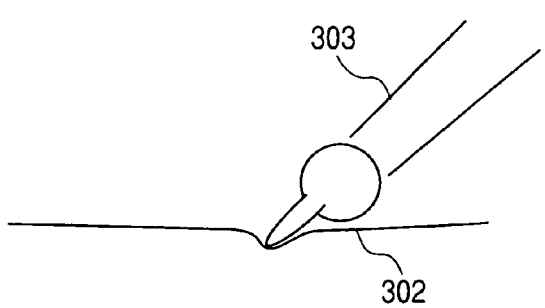

FIG. 3A and FIG. 3B illustrate characteristics necessary for the elastic member disposed on the surface of the input device of the invention. FIG. 3A illustrates an example which uses a fabric having relatively low elasticity, and FIG. 3B illustrates an example which uses a fabric having high elasticity. If the elastic member is too soft and the whole film stretches when user 303 presses its surface, the pressed position cannot be determined correctly because of much error. Therefore, the elastic member to be used in this invention should have adequate elasticity. Preferably, the member stretches only at the point pressed by the user's finger, as shown in FIG. 3B. Fibers having above characteristics include nylon and polyurethane which are used as a material for stockings or sports wears.

FIG. 4 illustrates relationship between the stroke and downward pressure from the beginning to the end of pressing. In the figure, a keyboard comprising mechanical switch 401 which is widely used in conventional keyboards, and a keyboard comprising an elastic member according to the invention are compared. Pressing begins at point A and ends at point B. In mechanical switch 401, load increases gradually as the key is pressed deeply. At certain point, a sound indicating key input is generated and the load decreases. At this time, a user has a "click" feeling generated by change in downward pressure. When the user continues pressing after "click" feeling 404, the key is actually input. The user learns that the key is actually input by having "click" feeling. However, abrupt change in downward pressure 403 causes much load on the finger, and is supposed to be one cause of development and pain of tendovaginitis.

On the other hand when the key has elastic member 402, no abrupt change occurred in the downward pressure. The downward pressure increases monotonically with the stroke. Compared to conventional mechanical switch 401, the load posed on the finger is remarkably reduced. Also, the time from beginning of pressing and actual input of the key can be adjusted as desired. The load on the finger, which is one cause of the tendovaginitis (or pain thereof), can be significantly reduced.

Figure 5:
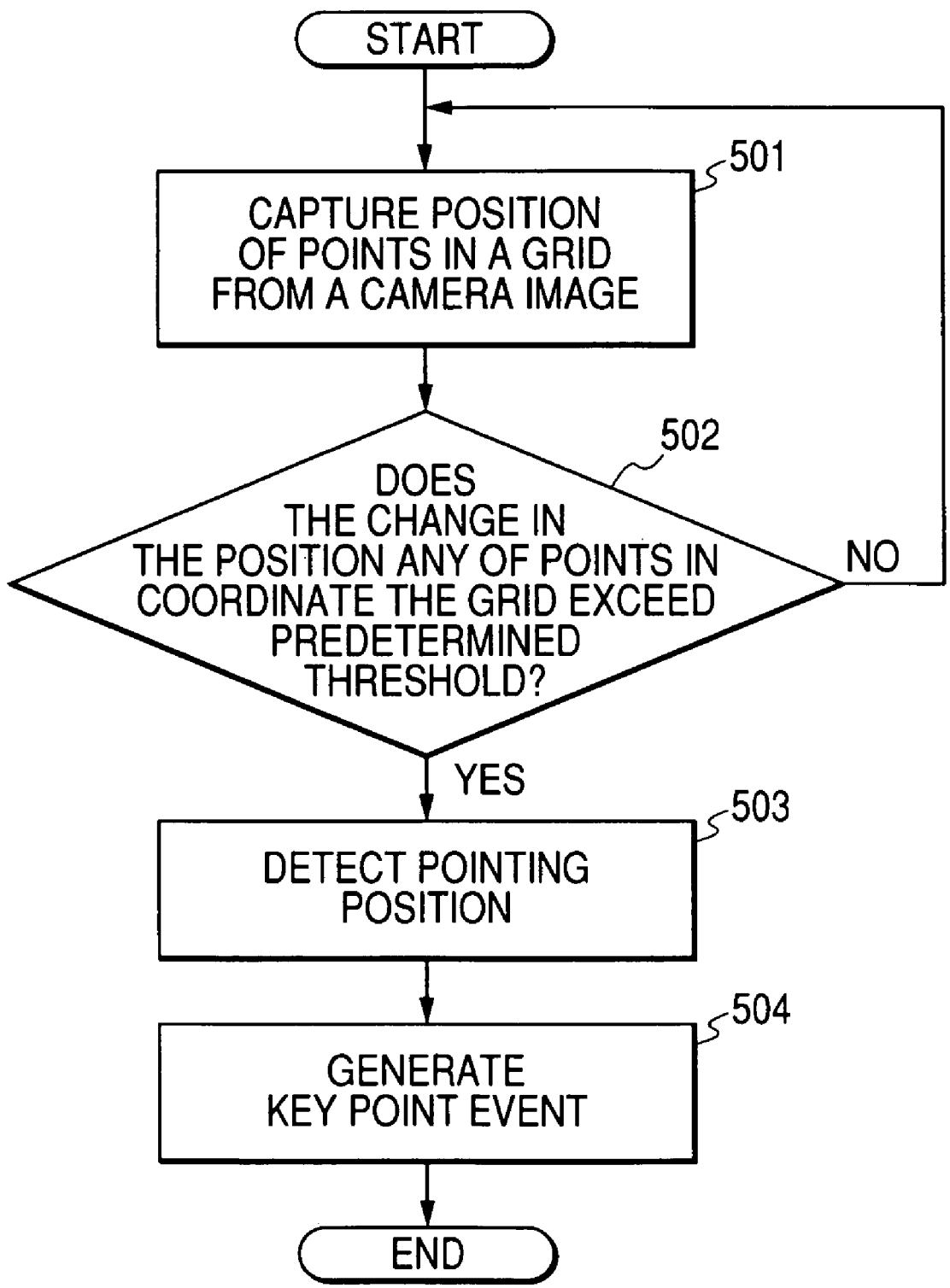
FIG. 5 illustrates a process flow according to the first embodiment of the invention including steps of analyzing an image taken by an imaging device installed in the input device, determining the pressed position, and generating a key event.

FIG. 5 illustrates a process flow of the method according to the invention. The process includes imaging the back surface of the elastic member when a key is pressed by the user's finger, detecting the pressed position by analyzing the image, and generating a key event corresponding to the pressed position.

The detail of each step is as follows. In Step 501, the image is analyzed to determine position coordinates of each grid point. In Step 502, it is determined whether any change in position coordinate is made over time at every grid point. When no change is detected, the process returns to Step 501 to repeat taking and analyzing images. When any change in position coordinate is detected for a grid point, the point is identified by calculating the coordinate value of the position pressed by the user using the change (direction and distance) in Step 503. In Step 504, the key is identified by retrieving the position coordinate stored in the memory of the computer. Then a key event (signal) corresponding to the pressed position is generated.

Figure 6:
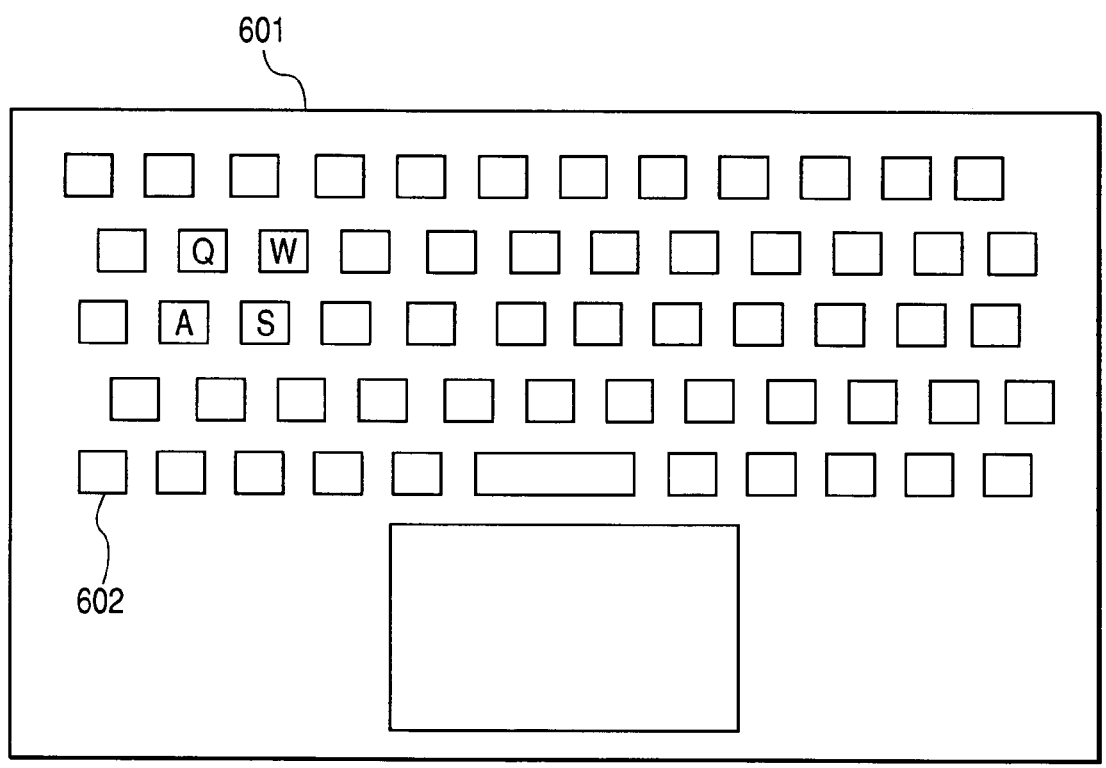
FIG. 6 illustrates an example of key assignment on the elastic member according to the invention.

FIG. 6 illustrates a layout of the top surface of the elastic member according to the invention. Name of a key can be directly printed on the top surface of elastic member 601 or, the user can attach a label having printed character according to his preferred layout or spacing. Besides ordinary keys, command keys including "Ctrl+" can be provided.

By using rather thick label or applying some bordering after layout, the user can identify the keys at the time of input with his or her finger.

Figure 7:
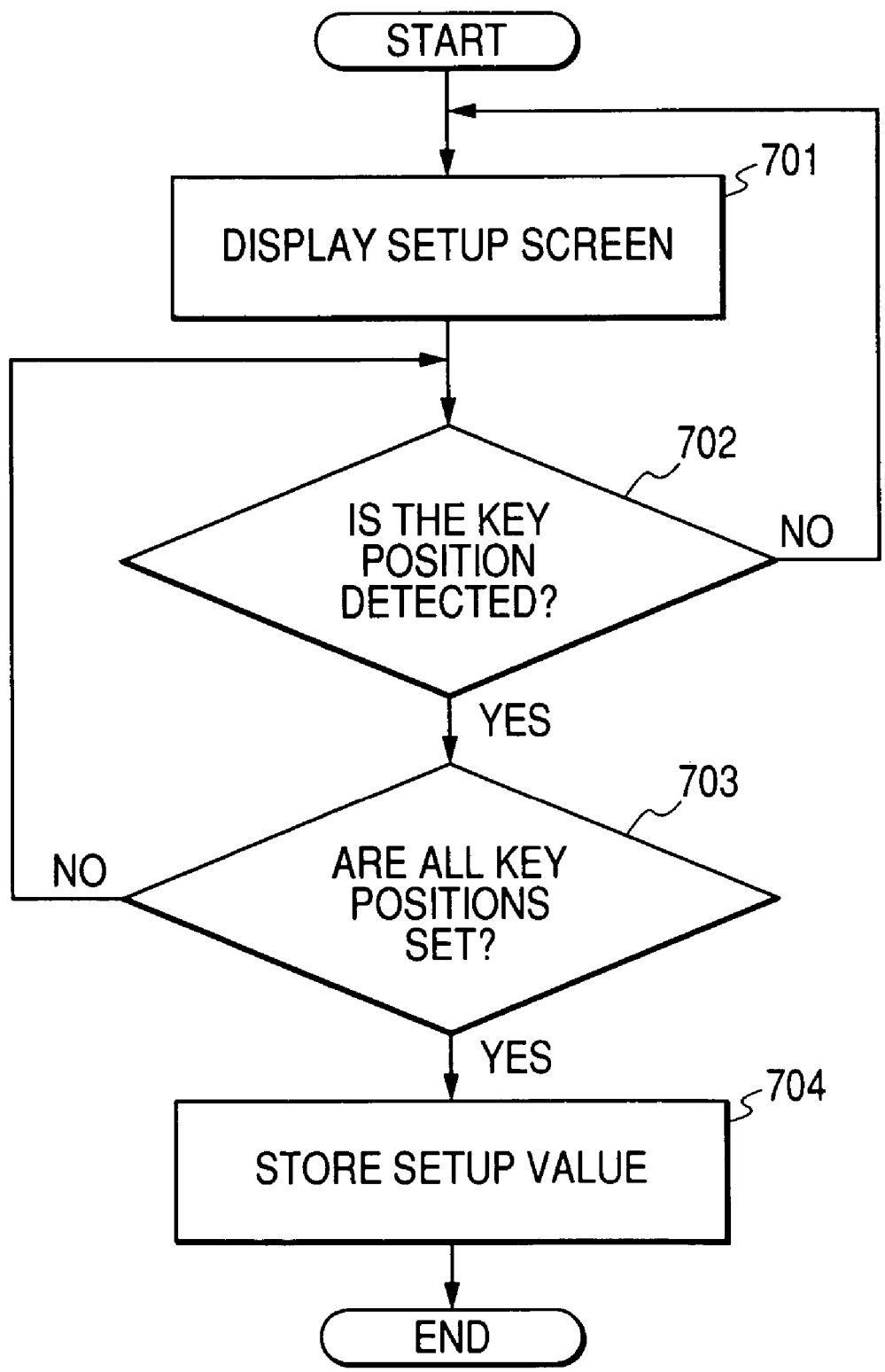
FIG. 7 illustrates an example to acquire key positions after assignment on the elastic member surface according to the invention.

FIG. 7 illustrates a process flow to store the key position information in the memory after the keys are assigned to the surface of the elastic member according to the invention.

The key position assigned by the user can be stored by having user press the newly assigned key one-by-one. First, in Step 701, an announce screen "Press A key" is displayed to prompt the user input. In Step 702, the user presses "A" key, and position of "A" key is input into the computer. This process is repeated for "B" key to "Z" key and other special keys to input position information for all keys. When position information has been input for all keys (Step 703), the information is stored in association with each key (Step 704).

Figure 8:
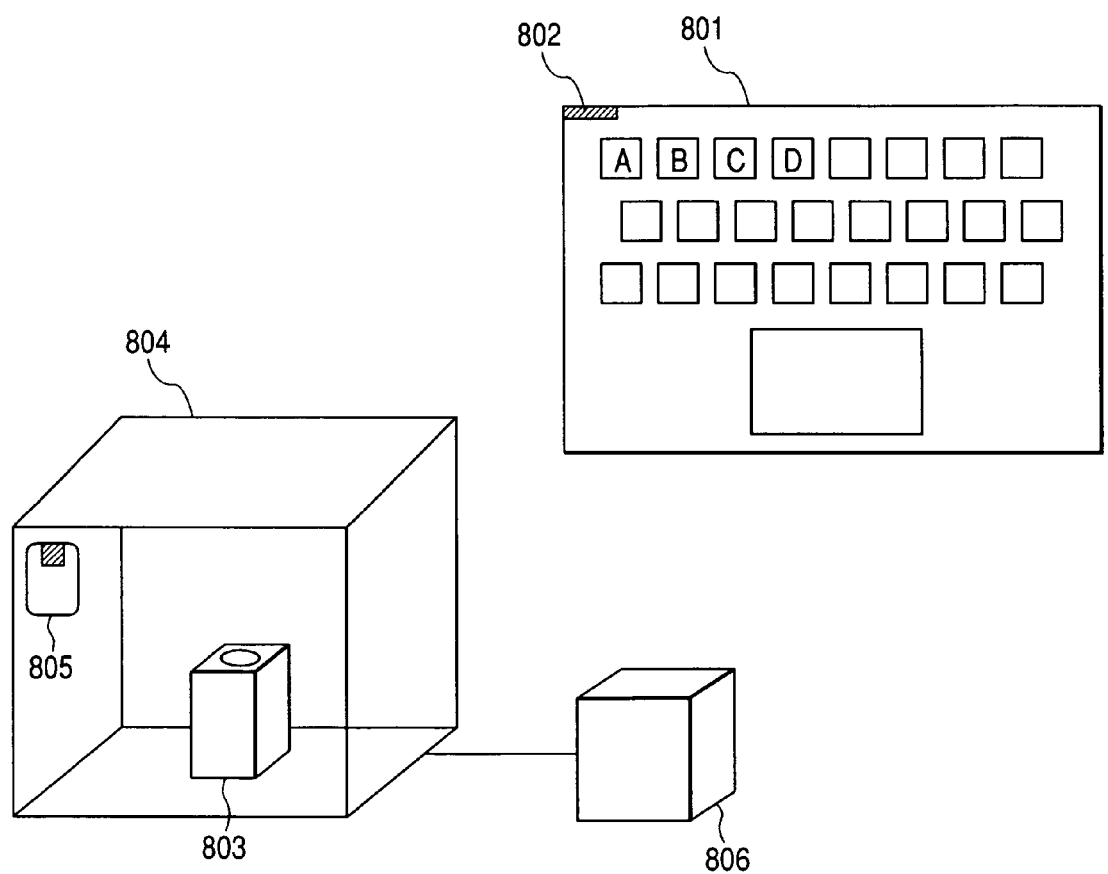
FIG. 8 illustrates an example to identify a key using RFID tag when the elastic member having key assignment is replaced according to the invention.

FIG. 8 shows an example to read the key assignment information corresponding to a tag, using a reader for reading RFID tags. For example, after assignment of keys, RFID tag is attached to elastic member 801. The key positions on the elastic member are stored in the memory of the computer in association with the attached tag. Elastic member 801 is attached to vessel 804 in which imaging device 803 is installed. RFID tag reader is installed in vessel 804. The RFID tag reader reads out tag information when elastic member 801 is attached to the top surface, and retrieves key assignment corresponding to elastic member 801 from the memory of computer 806, in order to generate a key event in response to user's input.

Figure 9:
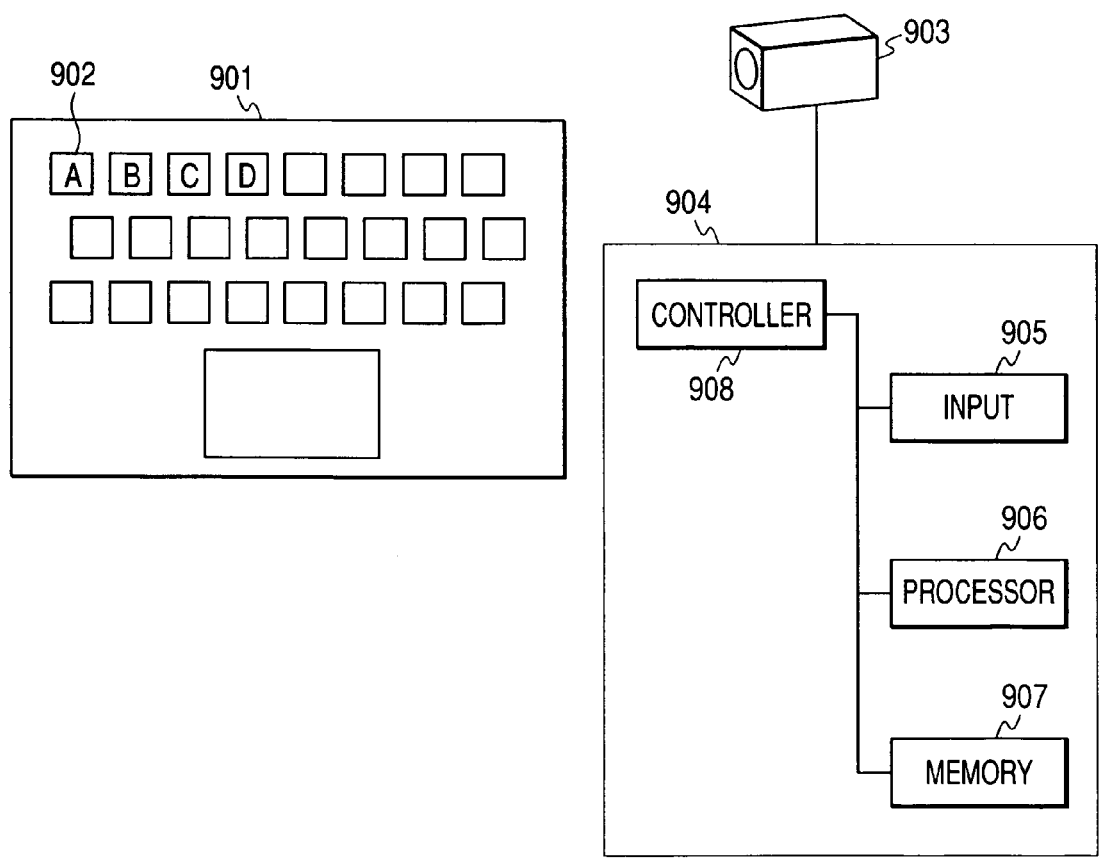
FIG. 9 illustrates an example to acquire key positions by using a camera after key assignment on the elastic member surface according to the invention.

FIG. 9 shows an example to read the key assignment using an imaging device such as a camera and image processing technique. For example, keys 902 are assigned on elastic member 901 according to user's preference. After assignment, an image covering whole surface of elastic member 901 is taken by imaging device 903 such as a camera. In the figure, 904 is a computer device such as a personal computer, 905 is an input which acquires an image from imaging device 903, 906 is a processor which analyzes the image to detect key assignment using character recognition or to identify a key from the pressed position based on the displacement of the grid points, 907 is a memory which stores key assignment information, and 908 is a controller which controls operations of input 905, processor 906, and memory 907.

Figure 10:
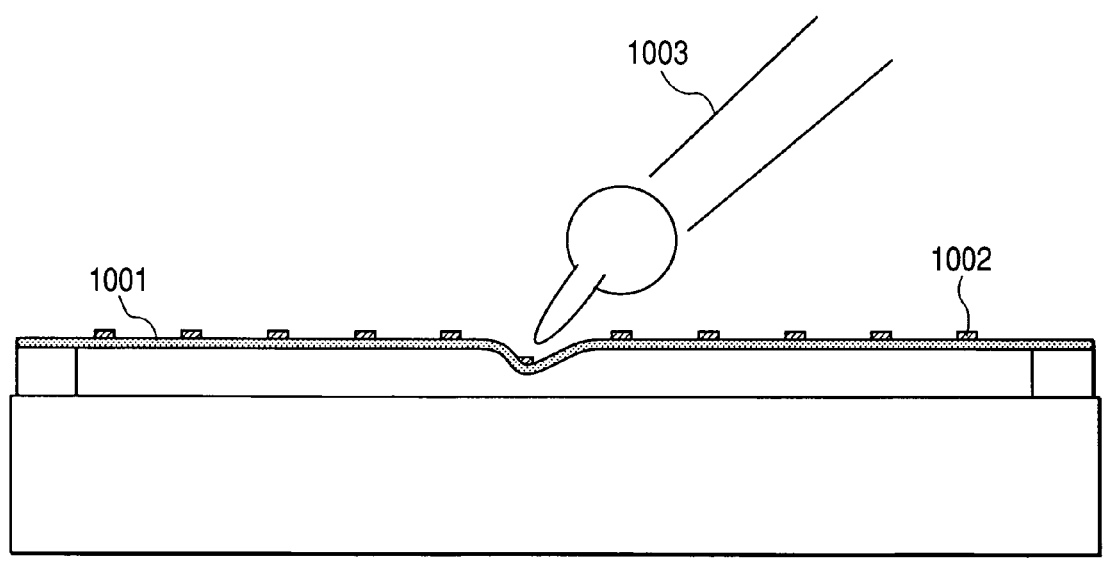
FIG. 10 illustrates an example wherein the user can identify keys by tactile impression of the surface of elastic member of the invention.

FIG. 10 shows an example in which the user can identify keys by tactile impression of the surface of elastic member according to the invention. By using a relatively thick elastic member on each key according to key assignment, the user can recognize the key position by tactile impression of the surface. This configuration helps user's key input.

In the above description, the position where the elastic member is pressed represents a key. Alternatively, the pressed position can be used as a coordinate (or its change over time), and used in an input device such as a touch pad.

Second Embodiment

Figure 11:
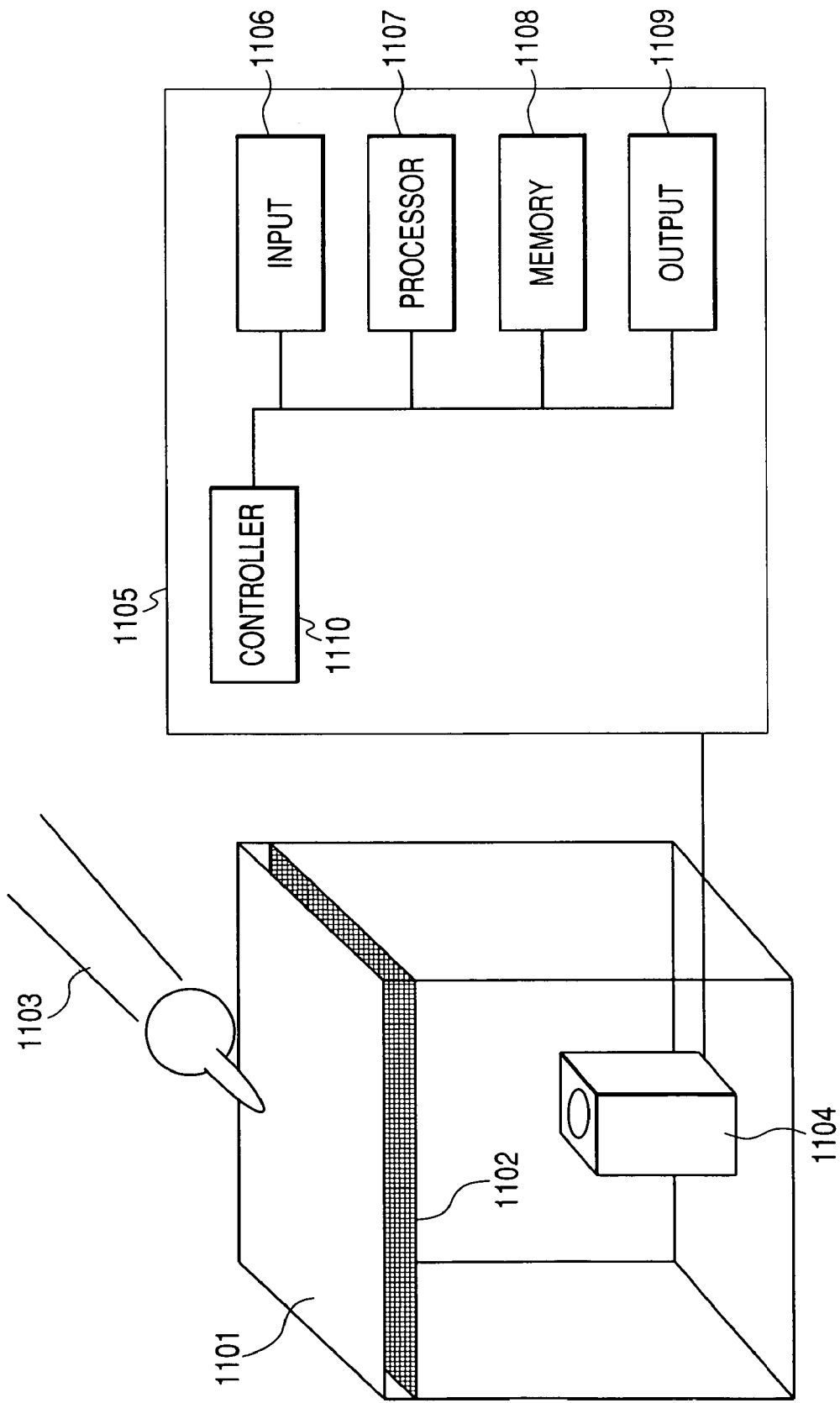
FIG. 11 is a block diagram which illustrates an input device according to a second embodiment of the invention.
Figure 12A:
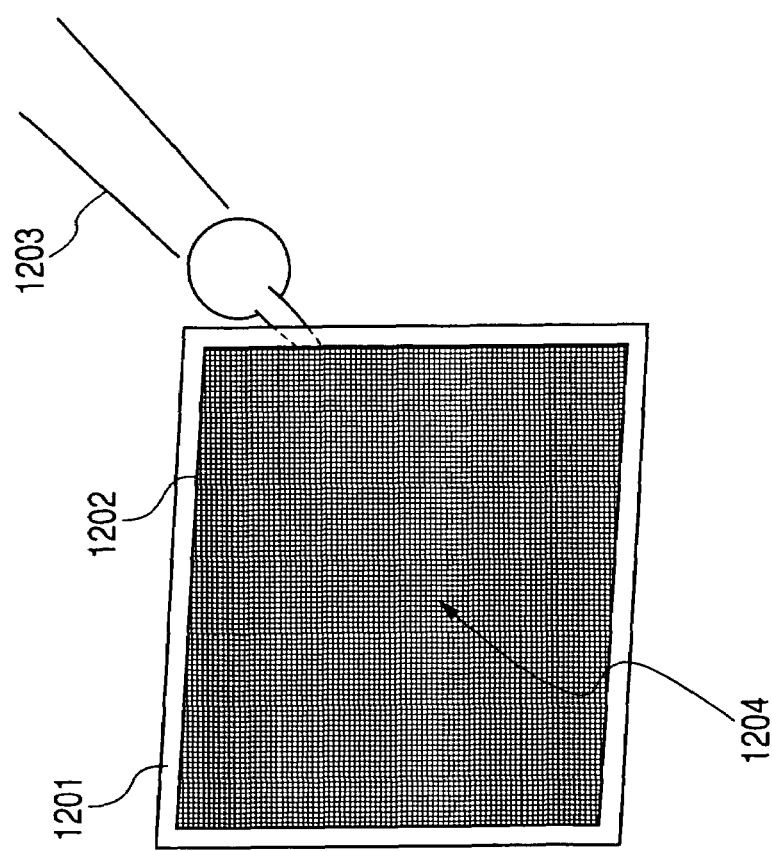
FIG. 12A and FIG. 12B illustrate the back surface before and after pressing the elastic member of the input device according to the second embodiment of the invention.
Figure 12B:
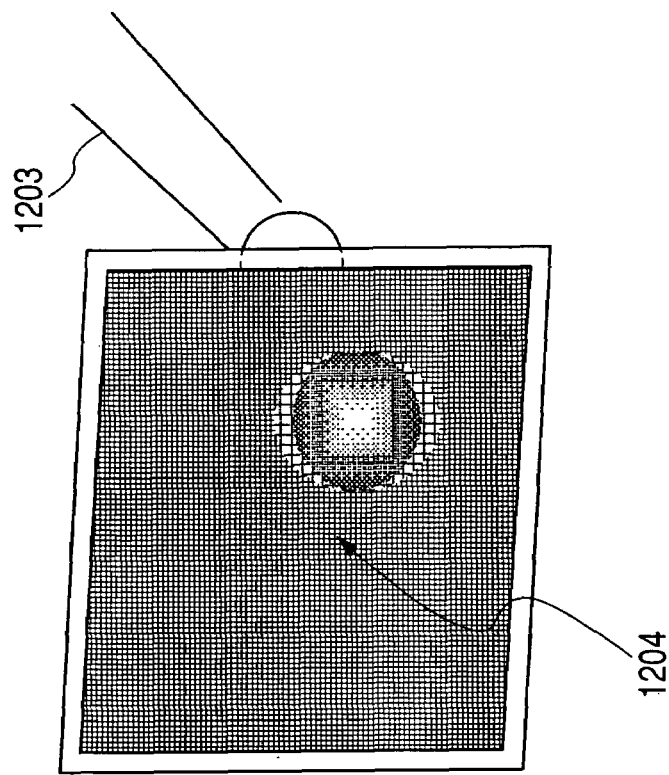
Figure 13:
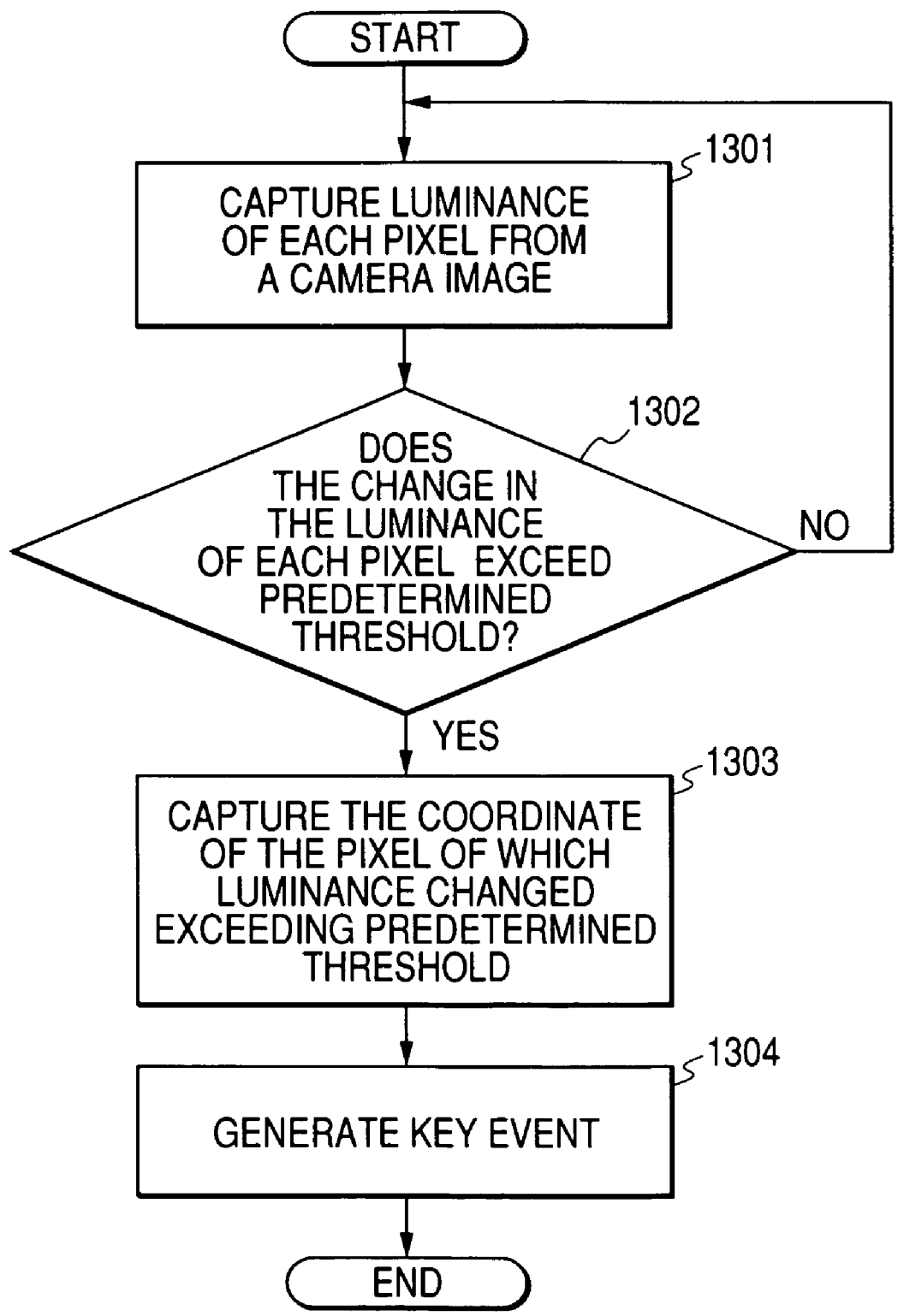
FIG. 13 illustrates a process flow according to the second embodiment of the invention including steps of analyzing an image taken by an imaging device installed in the input device, determining the pressed position, and generating a key event.

FIGS. 11 to 13 illustrate a second embodiment of the invention.

FIG. 11 is a block diagram which illustrates an embodiment of the invention. In the figure, 1101 is an elastic member having relatively fine mesh, 1102 is an elastic member having relatively coarse mesh compared with 1101, 1103 is a user, 1104 is an imaging device such as a camera installed to image the back surface of elastic member 1102, 1105 is a computer device such as a personal computer, 1105 is an input which acquires an image taken by imaging device 1104, 1107 is a processor which analyzes the image to detect pressed position, 1108 is a memory which stores information including setting information, 1109 is an output which generates a signal representing a key event based on the pressed position and setting information, and 1110 is a controller which controls operations of input 1106, controller 1107, memory 1108, and output 1109.

Elastic member 1101 may be made with a film comprising silicon rubber, or a fabric of nylon or polyurethane having high elasticity, for example.

Elastic member 1102 may be made with a fabric which has relatively coarse mesh but high elasticity such as a fabric used for stocking.

Elastic member 1101 is laid on elastic member 1102 without using adhesive between them.

Imaging device 1104 is installed so as to take an image covering whole back surface of elastic member 1102. Alternatively, a plurality of imaging devices can be installed to take partial images of the back surface. In this arrangement, the distance between elastic member 1102 and imaging device 1104 can be reduced.

Name of a key can be directly printed on the top surface of elastic member 1101 or, the user can attach a label having a printed character. User 1103 makes an input by pressing the intended key on the top surface of elastic member 1101.

FIG. 12A and FIG. 12B illustrate the back surface of the elastic member of the invention. FIG. 12A illustrates the surface before the elastic member is pressed with a finger, and FIG. 12B illustrates the surface after the elastic member is pressed. Before pressing, the elastic member is flat with no bending, thus the luminance of pixels in the image of the back surface of the elastic member is not changed. When the top surface of the elastic member is pressed by a finger, the member around the pressed position stretches. Elastic members 1201 and 1202 come close to each other in response to the downward pressure. Thus, seen from the imaging device (arrow 1204), luminance of some positions appears to be changed. By comparing the images taken in the conditions illustrated in FIG. 12A and FIG. 12B, the point pressed by the user 1203 can be calculated.

Even when user 1203 presses two positions on elastic members 1201 simultaneously, they can be identified if the positions are not same. Therefore, a user can carry out an operation involving two keys, for example, pressing one alphabet key and "Shift key" or "Ctrl key" simultaneously.

FIG. 13 illustrates a process flow of the operation according to the invention. The process includes steps of pressing the surface of two elastic members shown in FIG. 11, imaging the back surface of the elastic member when pressed by the user's finger, detecting the pressed position by analyzing the image, and generating a key event corresponding to the pressed position.

In Step 1301, the image is analyzed to determine luminance of each pixel. In Step 1302, the luminance of each pixel is monitored to detect any change over time. When no change is detected, the process returns to Step 1301 to repeat imaging and analyzing. When any change is detected for a pixel, the coordinate value of the pixel is calculated to determine the coordinate value of the position pressed by the user in Step 1303. In Step 1304, the position information of the key is retrieved from the memory of the computer, and a key event corresponding to the pressed position is generated.

Third Embodiment

FIG. 14 to FIG. 17 illustrate a third embodiment of the invention.

Figure 14:
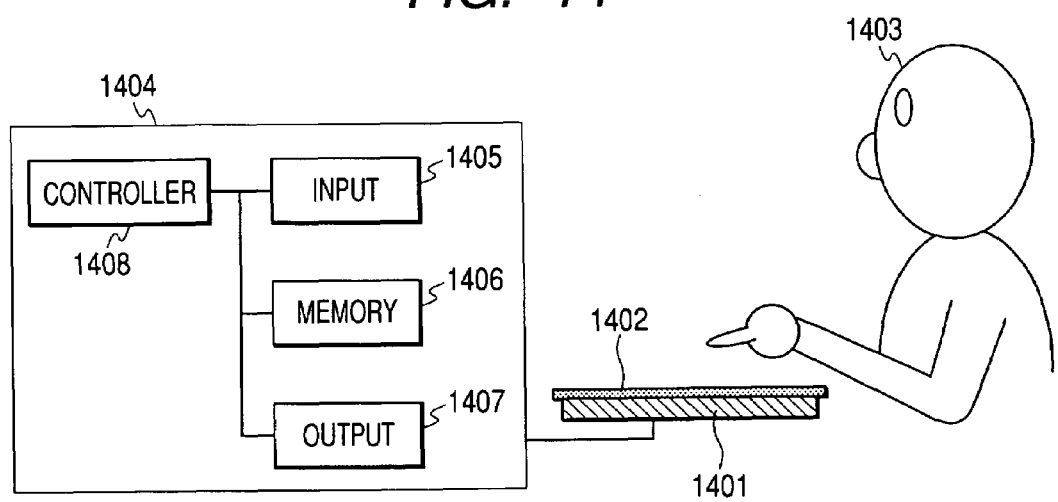
FIG. 14 is a block diagram which illustrates an input device according to a third embodiment of the invention.

FIG. 14 is a block diagram which illustrates an embodiment of the invention. In the figure, 1401 is a position detection unit such as an infrared touch panel, 1402 is an elastic member which covers the surface of position detection unit 1401, 1403 is a user, 1404 is a computer device such as a personal computer, 1405 is an input which acquires data from position detection unit 1401, 1406 is a memory which stores information including setting information, 1407 is an output which generates a key event in response to input data, and 1408 is a controller which controls operations of input 1405, memory 1406, and output 1407.

Position detection unit 1401 is a device such as an infrared touch panel frame attached to a monitor that detects positions by using a plurality of light emitting element pairs and infrared sensors. The elements and sensors are arrayed in a horizontal and vertical matrix. When a finger blocks the infrared grid area of these light emitting elements, the position of the finger can be detected.

The distance between position detection unit 1401 and elastic member 1402 can be adjusted by interposing an appropriate member between them. That is, the distance can be set according to user's preference.

Elastic member 1402 may be made by a film comprising silicon rubber, or a fabric of nylon or polyurethane having high elasticity, for example.

Name of a key can be directly printed on the top surface of elastic member 1402 or, the user can attach a label having a printed character. User 1403 makes an input by pressing the intended key on the top surface of elastic member 1402.

When an infrared touch panel which can identify a plurality of points, for example an infrared touch panel which can identify two points simultaneously is used as position detection unit 1401, the user can carry out an operation involving two keys such as pressing one alphabet key and "Shift key" or "Ctrl key" simultaneously. When the detection unit can detect only one point, similar operation can be carried out by providing switch-like ON/OFF function to "Shift key" and "Ctrl key".

Figure 15A:
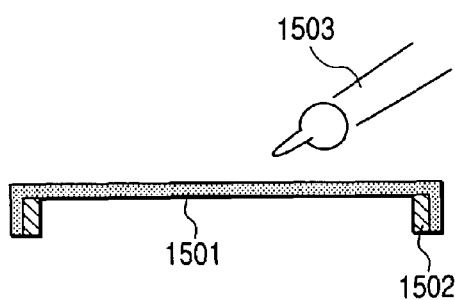
FIG. 15A and FIG. 15B illustrate the back surface before and after pressing the elastic member of the input device according to the third embodiment of the invention.
Figure 15B:
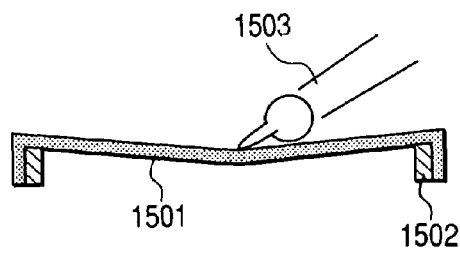

FIG. 15A and FIG. 15B illustrate the surface of the elastic member of the invention. FIG. 15A illustrates the surface before the elastic member is pressed with a finger. Before pressing, the elastic member is flat with no bending, thus the infrared grid emitted from position detection unit 1502 such as an infrared touch panel is not blocked. When elastic member 1501 is pressed by a finger, the member 1501 around the pressed position stretches as shown in FIG. 15B. The infrared grid of infrared touch panel 1502 is blocked and the pressed position can be detected.

FIG. 16 is a block diagram of an embodiment in which "click" feeling is generated for user at input operation. In the figure, 1601 is a device such as an infrared touch panel which detects position of a finger, 1602 is an elastic member which covers surface of position detection unit 1601, 1603 is a user, 1604 is a light emitting element such as LED, 1605 is a speaker, 1606 is a computer device such as a personal computer, 1607 is an input which acquires data from position detection unit 1601, 1608 is a processor which determines the pressed position from input data, 1609 is a memory which stores information including setting information, 1610 is an output which generates a key event in response to input data, and 1611 is a controller which controls operations of input 1607, processor 1608, memory 1609, and output 1610.

Light emitting element 1604 and speaker 1605 is attached to the bottom of position detection unit 1601. When user 1603 makes input, sound is output from computer 1606 at the time of a key event. The user can hear the sound via speaker 1605.

The speaker 1605 can be turned ON/OFF. When the user 1603 does not use feedback by sound, speaker 1605 can be turned OFF.

The output from computer 1606 to speaker 1605 can be branched to LED light emitting element 1604. When user 1603 makes input, LED as a visual feedback is flashed at the time of the key event. Alternatively, user 1603 can select type of the feedback, e.g., only light feedback emitted from LED, only sound feedback, or simultaneous light and sound feedback.

Figure 17:
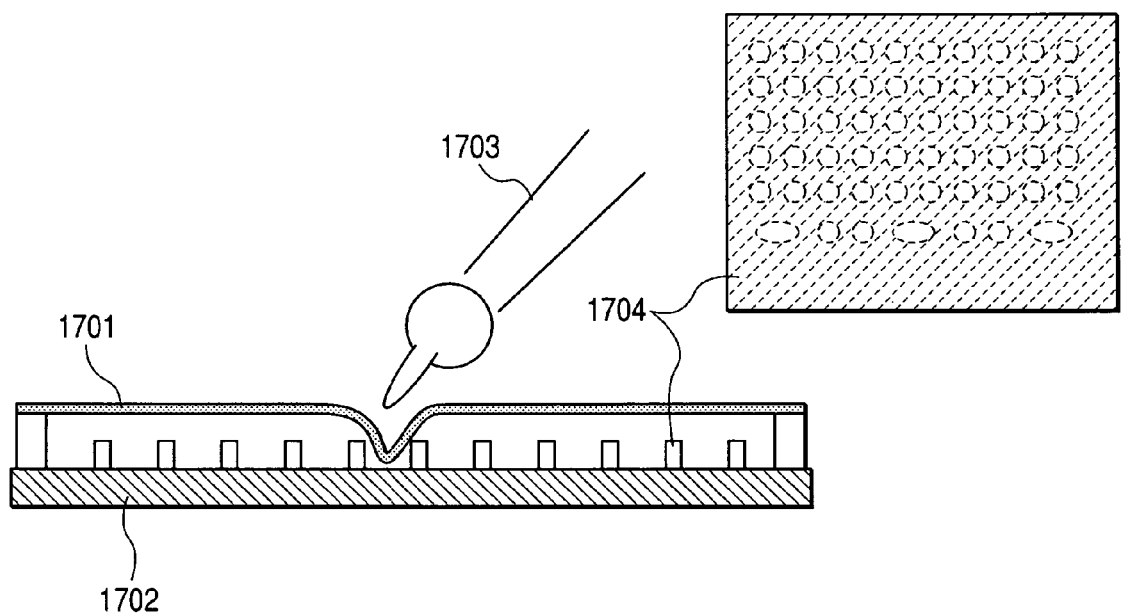
FIG. 17 illustrates an example to avoid erroneous input in the input device according to the third embodiment of the invention.

FIG. 17 shows an example to avoid erroneous input in the input device according to the invention. A member 1704 is provided between elastic member 1701 and position detection unit 1702 such as an infrared touch panel.

Member 1704 is made from soft material such as a fabric or a film. A hole is made at each key position. When user 1703 makes an input by pressing exact key position, the key can be pressed. However, when user fails to press exact key position, the key is blocked by member 1704, so that erroneous input can be avoided.

What is claimed is:

1. An input device for keyboard input or position input based on position information comprising:
    an elastic film member;
    an imaging unit which images the elastic film member from the side opposite to the user input side; and
    a processor,
    wherein the processor detects deformation of the elastic film member based on the change in the image thereof taken by the imaging unit, and identifies the position which user pressed on the elastic film member.

2. The input device of claim 1, wherein the processor refers the correspondence between a position and a key stored in advance in a memory, and generates a key event based on the position pressed by the user.

3. The input device of claim 1, wherein the elastic film member has a pattern on the surface facing to the imaging unit, and the processor identifies the pressed position based on the displacement of the pattern detected from the image taken by the imaging unit.

4. The input device of claim 1, wherein the elastic film member comprises a plurality of film members, the surface of the film member facing to the imaging unit has a mesh pattern, and the processor identifies the pressed position based on the change in luminance in an image taken by the imaging device, the change in luminance being generated by the plurality of film members coming close together by force applied thereto.

5. The input device of claim 2, wherein the correspondence between the key and the position is stored in the memory by having the user press keys one-by-one in response to a prompt from the processor.

6. A setting method of an input device used for keyboard input based on position information, the input device including an elastic film member, a sensor which detects the position on the elastic film member pressed by a user, a memory which stores the correspondence between a position on the elastic film member and the key, and a processor, the method comprising:

designating a key to the user;

identifying the position of the key pressed by the user in response to the designation by using the sensor and the processor; and storing the correspondence between the key and the position in the memory;

wherein the sensor is an imaging device, the elastic film member has a pattern on the surface facing to the sensor, and the processor identifies the pressed position based on the displacement of the pattern detected from the image taken by the imaging device.

7. The setting method of the input device of claim 6, wherein the sensor is an imaging device, the elastic film member including a plurality of film members, the film member has a mesh pattern on the surface facing to the sensor, and the processor identifies the pressed position based on the change in the luminance detected from an image taken by the imaging device, the change in the luminance being generated by a plurality of film members coming close to each other by force applied thereto.

8. The setting method of the input device of claim 6, wherein the sensor includes a plurality of infrared sensors to scan inside of a frame, the elastic film member is installed on the side facing to the user in the frame of the sensor, and the processor identifies the position on the elastic film member pressed by the user based on that some infrared sensors of the plurality of infrared sensors are blocked by force applied thereto.

* * * * *